United States Patent Office 2,871,977
Patented Feb. 3, 1959

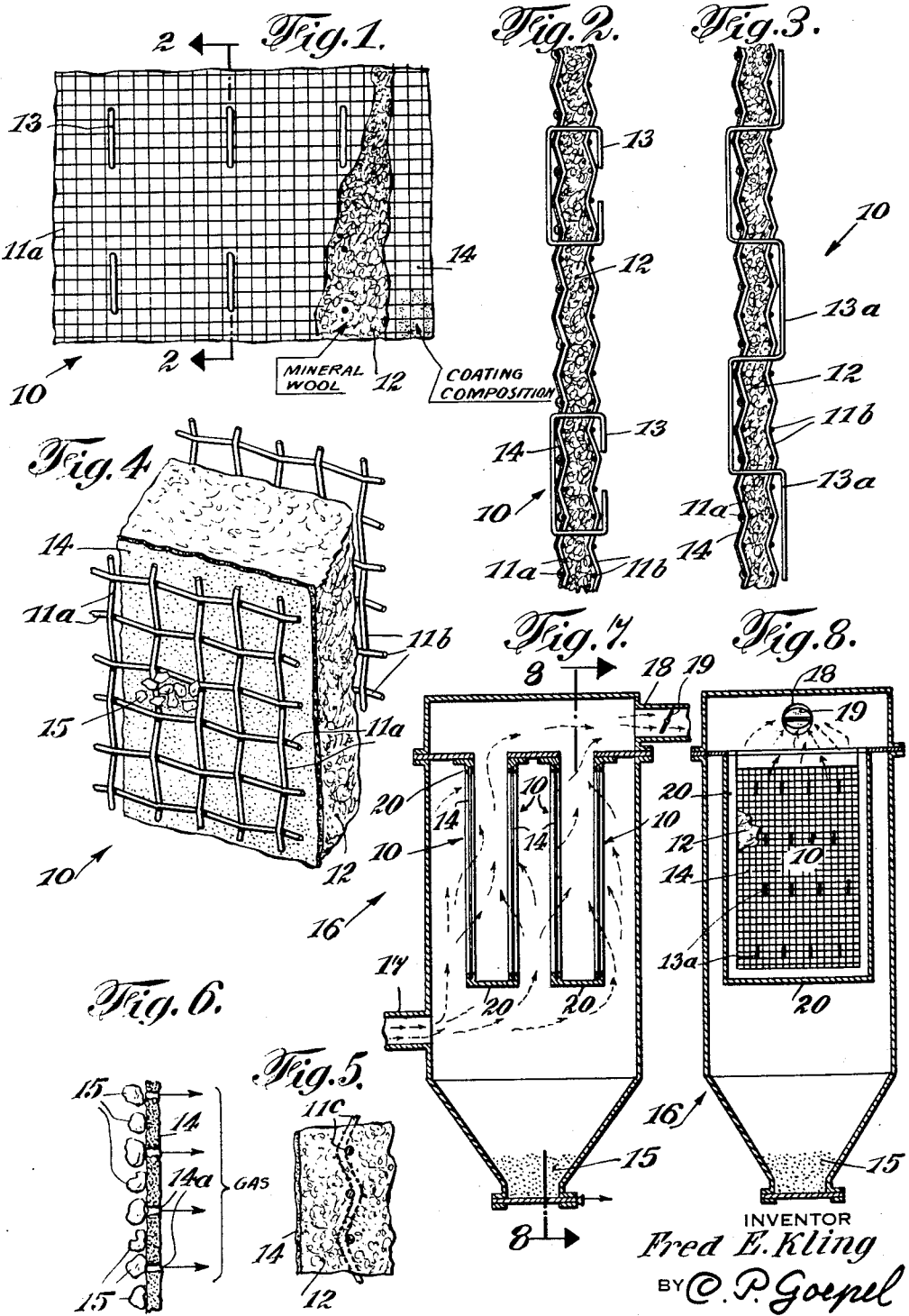

2,871,977

HOT GAS FILTERS

Fred E. Kling, Tenafly, N. J.

Application December 12, 1955, Serial No. 552,342

9 Claims. (Cl. 183—45)

This invention relates to gas filters, and more particularly to filters for removing fine particulate matter from hot gases.

The cleaning of gases in industrial plants, e. g., of the open hearth stack gases, represents a grave and urgent problem, especially in densely populated industrial regions, and the known filters do not meet the standard requirements for removal of 95 percent of contaminants. The problem is even intensified when the gases are hot, since the fume is discharged from furnaces at temperatures ranging from 1100° F. to 1500° F., and even if waste heat boilers are employed, the temperatures are reduced to between 500° F. and 600° F. only. Mechanical filters of temperature resistant material have a short usable life and hence require frequent interchange which renders their use uneconomical in addition to the fact that such refractory filters do not remove fumes whose particle size is generally less than 0.5 micron. Attempts were also made to agglomerate the sub-micron fume particles and to then pass the same through various mechanical filters. Continuously moving filter beds were proposed to maintain high efficiency and to prevent clogging of the refractory material, but such filters require costly, complicated and voluminous apparatus. Mineral wool is the preferred material for the refractory filter beds, even though it does not possess sufficient tensile strength because of brittleness and incapacity to withstand the vibrations to which the filter is subjected. This is overcome by the provision of one or more wire screens, but it has also been proposed to impregnate the pad with a suitable medium in order to maintain a desired degree of porosity. However, such pads also require interchange after a relatively short period of use since the dirty gases enter the pores of the pad and the solid particles are at least partly accumulated therein, which results in reduced porosity and subsequent higher resistance to the passing gases.

The filter of this invention provides a satisfactory solution of the above enumerated problems in that it:

(a) Resists elevated temperatures for extended periods of time;

(b) Is of sufficient strength to withstand the mechanical stresses;

(c) Prevents clogging of the refractory pad by removing the solid matter prior to the enry of gases into the pad proper;

(d) Permits simple and convenient removal of separated contaminants;

(e) Permits efficient control of the porosity;

(f) Permits passage of gases without booster fans;

(g) Achieves a superior degree of filtration, and (h) May be manufactured from readily available materials.

The novel filter includes a carrier consisting of a thin pad of refractory material, which is armored with one or more screens of wire mesh and, if two screens are used, preferably strengthened by metallic threads or staples to form a rigid unitary structure. The actual filter is applied to an exposed surface of this carrier in the form of a thin film and consists of a layer of sodium or potassium silicate as a vehicle for finely powdered soapstone, graphite, aluminum or similar materials. Before application, the silicate vehicle is diluted in water and appropriate amounts of powdered matter are then added thereto to achieve the desired degree of porosity. Since all the elements of the filter can withstand elevated temperatures of the exhaust gases, and since the solid matter is prevented from entry into, and from clogging of, the filter, it may be used for years without interchange while maintaining the same high degree of efficienecy which may reach 99 percent, i. e., higher than in any known commercial gas filters. The smooth filtering film may be conveniently cleaned, when necessary, since the separated particles will accumulate on its surface only, leaving its porosity as well as the porosity of the carrier pad unchanged.

In the preferred embodiment of the invention, a carrier of mineral wool is used and a reinforcing screen is inserted into the pad, or a pair of screens is provided on both sides of the mineral wool layer. The screens may be connected by a number of metallic staples or by a continuous thread of stainless steel wire. However, such conventional structures serve only as a carrier for the novel filtering composition which is applied to the exposed surface thereof and may be of a controlled porosity which is variable by varying the proportions and particle size of its ingredients.

The filtering film is cemented to the carrier surface at high temperatures and the filtering action takes place before the gases enter the pad of refractory carrier material. While some other substances may also possess the required properties, it has been found that sodium or potassium silicate is a good vehicle for the ceramic or metallic dusts needed in the preparation of the filtering paints for application to the armored refractory pad. As it is important that the filtering composition remain porous after drying and subsequent baking to about 1200° F., water must be added to the vehicle in controlled amounts. Too much water will prevent the film from adhering to the carrier. Experimental results justify a mixture of about two parts by volume of water with about one part by volume of silicate vehicle.

Ceramic and metallic dusts, such as graphite, aluminum or soapstone in finely divided form are considered to be satisfactory ingredients of the filtering paint to reduce its pores to a desired extent and to provide a smooth slippery surface from which the contaminants may be removed by rapping of the filter. Simple tests will determine the desired proportions of the ingredients.

Several other features and advantages of the novel filter will become apparent and will be explained in more detail in the course of the following description of some at this time preferred embodiments thereof with reference to the illustrations of the accompanying drawing, and the invention will be finally pointed out in the appended claims.

In the drawing, wherein similar characters of reference indicate similar elements, Fig. 1 is a front elevation of the novel filter with the visible screen partly broken away;

Fig. 2 is a vertical section taken on line 2—2 in Fig. 1;

Fig. 3 is a section similar to that of Fig. 2, showing a metallic thread as the connecting medium for the screens;

Fig. 4 is an enlarged perspective view of a portion of the filter of Fig. 1;

Fig. 5 is an enlarged section taken through a further modification of the novel filter;

Fig. 6 is a somewhat schematic representation of the filtering action of the novel coating composition;

Fig. 7 is a vertical section through a filtering chamber with a plurality of novel filtering units installed therein; and Fig. 8 is a section taken on line 8—8 in Fig. 7.

Referring now in detail to the illustrated embodiments, and more particularly to Figs. 1, 2 and 4, the filtering unit 10 includes a rigid carrier consisting of a pair of screens 11a, 11b of steel wire, preferably stainless steel, a prefabricated thin pad of refractory material 12, preferably mineral wool, and a plurality of wire staples 13, suitably spaced to form a rigid unit. When in use, the pad is exposed to dirty gases with its surface which is provided with a filtering coating 14 consisting of sodium or potassium silicate as a vehicle for finely divided ceramic or metallic dust, such as aluminum, soapstone or graphite. Before applying to the carrier, the silicate vehicle is diluted in water to obtain a desired degree of porosity and to assure permanent adhesion to the carrier. The vehicle or paint is applied to the carrier at lower temperatures and is cemented thereto at elevated temperatures of up to about 1200° F. As seen in Figs. 4 and 6, the microscopic dust or fume particles 15 hit the film 14 and being unable to penetrate its pores 14a, accumulate on the surface of the film and are periodically shaken off, dropping to the bottom of the filtering chamber. The cleaned gases then pass the carrier pad 12 which, even though a filter by itself, serves only as a permeable carrier for the actual filter 14 and permits the passage of gases therethrough. The life span of the filter is thereby substantially increased since no foreign matter will accumulate in the pores of the refractory pad 12, and all the elements of the filter are capable of withstanding the elevated temperatures of the filtered gases.

A similar carrier is shown in Fig. 3, wherein a thread of stainless steel wire 13a replaces the wire staples 13. This thread may be applied to the carrier by special sewing machines. Obviously, the carrier may be made rigid in a number of different ways, the essential requirement being that the binding medium resist the prevailing temperatures of the filtered gases. Instead of a pair of screens 11a, 11b, a single screen 11c may be provided in the refractory pad 12 in a manner well known in the art of making filters (see Fig. 5), and the filtering film 14 applied to either of the exposed surfaces of the pad 12.

The size and thickness of the prefabricated refractory pad 12 are chosen in accordance with the required filtering area, and the entire filter 10 may be mounted into a conventional filtering frame or installed in the duct in any other manner. A satisfactory refractory pad is one known in the trade under the name "Ceramic Filter Paper," which is capable of standing temperatures of up to 2300° F. This refractory pad is rather thin, for example about $\frac{1}{32}''$, in order to keep the resistance to the passing gases to a minimum. The present filter therefore does not require a booster fan which is necessary when thick ceramic filters of 2″ and more are used.

A suitable form of a filtering chamber 16 is illustrated in Figs. 7 and 8. Contaminated gases enter through conduit 17 and thereupon pass one or a plurality of parallel filters 10 through their respective filtering layers 14. Filters 10 are mounted in frames 20. Cleaned gases are led away through a conduit 18 controlled by a valve 19. The separated dust and fumes 15 accumulate in the bottom of chamber 16 and may be periodically removed therefrom.

The smooth and slippery ingredients of the silicate vehicle will permit easy removal of the accumulated dust when the filter is rapped, and can withstand the elevated temperatures of the filtered gases. The porosity of the film 14 is controlled by varying the particle size of the ceramic or metallic dust. The following examples of the composition and the mode of application of the coating composition 14 are given for the purpose of explanation only, and are not to be construed in a limitative sense:

Example I

Three parts by volume of sodium silicate were mixed with six parts by volume of water, and one part by volume of aluminum powder passing through a screen of 325 mesh added thereto. The mixture was applied to the surface of a reinforced mineral wool paper and cemented thereto at temperatures between 800° F. and 1200° F., starting at 80° F., for a period of 30 minutes.

Example II

A coating composition consisting of one part by volume of graphite powder, one part by volume of sodium silicate, and two parts by volume of water, was applied and cemented to a reinforced refractory pad in the same manner as described in Example I.

Example III

Three parts by volume of finely divided soapstone, 2 parts by volume of sodium silicate, and four parts by volume of water were mixed, and the mixture applied and cemented to a reinforced mineral wool pad in the same manner as in Example I.

It will be seen that I have provided an effective and economical filter for hot gases which differs from the known filters in that the solid matter is separated from the fluid medium prior to its entry into any of the permeable filter layers. This is achieved by applying the thin film to a permeable refractory pad, which pad may be cut to any desired size and shape, and controlling the porosity of the filtering film by varying the proportions of its ingredients.

While some preferred embodiments of the novel filter have been shown and described, various changes and modifications in the proportions and selection of disclosed or equivalent materials may be made by persons skilled in the art, and I therefore do not desire to be limited to the exact details of the filters shown and described, but only by the scope of the appended claims.

I claim:

1. A hot gas filter consisting of a permeable carrier of refractory material and a permeable heat-hardened, dry coating composition applied to an exposed surface of said carrier, said coating composition consisting of a silicate vehicle and finely divided dust of a heat resistant material, said vehicle selected from the group consisting of sodium and potassium silicate, the permeability of said composition being lower than the permeability of said carrier.

2. A hot gas filter consisting of a reinforced permeable carrier of refractory material and a permeable heat-hardened, dry coating composition applied to an exposed surface of said carrier, said coating composition consisting of a silicate vehicle and finely divided dust of a heat resistant material, said vehicle selected from the group consisting of sodium and potassium silicate, the permeability of said composition being lower than the permeability of said carrier.

3. A hot gas filter formed by an armored permeable carrier of refractory material and a permeable heat-hardened, dry coating composition applied to an exposed surface of said carrier, said coating composition consisting of a silicate vehicle and finely divided dust of a heat resistant material, said vehicle selected from the group consisting of sodium and potassium silicate, the permeability of said composition being lower than the permeability of said carrier.

4. A hot gas filter consisting of a reinforced permeable refractory carrier and a coating composition cemented to an exposed surface of said carrier at temperatures exceeding 600° F., the permeability of said composition being lower than the permeability of said carrier, said composition including a silicate vehicle selected from the group consisting of sodium and potassium silicate, and finely divided aluminum dust.

5. A hot gas filter consisting of a reinforced permeable refractory carrier and a coating composition cemented to an exposed surface of said carrier at temperatures exceeding 600° F., the permeability of said composition being lower than the permeability of said carrier, said composition including a silicate vehicle selected from the group consisting of sodium and potassium silicate, and finely divided graphite powder.

6. A hot gas filter consisting of a reinforced permeable refractory carrier and a coating composition cemented to an exposed surface of said carrier at temperatures exceeding 600° F., the permeability of said composition being lower than the permeability of said carrier, said composition including a silicate vehicle selected from the group consisting of sodium and potassium silicate, and finely divided soapstone powder.

7. A dry, permeable coating composition cemented to a gas permeable refractory pad at temperatures exceeding 600° F. consisting of a silicate vehicle and aluminum dust, wherein said vehicle is selected from the group consisting of sodium and potassium silicate.

8. A dry, permeable coating composition cemented to a gas permeable refractory pad at temperatures exceeding 600° F. consisting of a silicate vehicle and graphite powder, wherein said vehicle is selected from the group consisting of sodium and potassium silicate.

9. A dry, permeable coating composition cemented to a gas permeable refractory pad at temperatures exceeding 600° F. consisting of a silicate vehicle and soapstone in finely divided form, wherein said vehicle is selected from the group consisting of sodium and potassium silicate.

References Cited in the file of this patent

UNITED STATES PATENTS

| | | |
|---|---|---|
| 1,762,990 | Jones et al. | June 10, 1930 |
| 2,123,049 | Irby | July 5, 1938 |
| 2,579,984 | Trowbridge | Dec. 25, 1951 |
| 2,620,044 | Fine et al. | Dec. 2, 1952 |
| 2,627,938 | Frohmader | Feb. 10, 1953 |
| 2,664,172 | Butterfield | Dec. 29, 1953 |